United States Patent
Bedilion et al.

(12)
(10) Patent No.: US 6,420,114 B1
(45) Date of Patent: Jul. 16, 2002

(54) MICROARRAY HYBRIDIZATION CHAMBER

(75) Inventors: Tod Bedilion, San Carlos; Lozen Titsworth, Fremont; Erik Bjeldanes, Lafayette; Douglas Gilliland, Sunnyvale; Lyle Arnold, Poway, all of CA (US)

(73) Assignee: Incyte Genomics, Inc., Palo Alto, CA (US)

( * ) Notice: Subject to any disclaimer, the term of this patent is extended or adjusted under 35 U.S.C. 154(b) by 0 days.

(21) Appl. No.: 09/454,520

(22) Filed: Dec. 6, 1999

(51) Int. Cl.[7] .................................................. C12Q 1/68
(52) U.S. Cl. ...................... 435/6; 435/91.1; 435/286.7; 435/288.3; 366/144; 366/262; 422/102; 436/174
(58) Field of Search ................................ 122/292, 307; 366/182.1, 182.2, 262, 144; 417/207, 208, 52; 422/102, 104; 436/174, 180, 181; 435/288.3, 286.7, 6, 91.1

(56) References Cited

U.S. PATENT DOCUMENTS

| | | | |
|---|---|---|---|
| 5,222,808 A | 6/1993 | Sugarman et al. | 366/174 |
| 5,322,799 A | 6/1994 | Miller et al. | 436/165 |
| 5,438,959 A | 8/1995 | Stone et al. | 119/248 |
| 5,443,985 A | 8/1995 | Lu et al. | 435/240.25 |
| 5,605,653 A | 2/1997 | DeVos | 261/77 |
| 5,910,288 A | 6/1999 | Schembri | 422/102 |
| 5,947,784 A | 9/1999 | Cullen | 446/15 |
| 6,065,864 A * | 5/2000 | Evans et al. | 366/167.1 |
| 6,186,659 B1 * | 2/2001 | Schembri | 366/262 |

FOREIGN PATENT DOCUMENTS

| | | |
|---|---|---|
| DE | 197 28 520 | 1/1999 |
| EP | 0933126 | 8/1999 |
| GB | 1246566 | 9/1971 |

* cited by examiner

*Primary Examiner*—David A. Redding
(74) *Attorney, Agent, or Firm*—Richard Aron Osman

(57) ABSTRACT

A method and apparatus is provided for mixing a film of fluid, particularly a film of chemical, biochemical, or biological fluids, undergoing a reaction. The apparatus comprises a means for creating a bubble within the film of fluid, and moving the bubble in the fluid, thereby mixing the fluid.

30 Claims, 1 Drawing Sheet

MICROARRAY HYBRIDIZATION CHAMBER

TECHNICAL FIELD

This invention relates to mixing fluids, and more particularly relates to an apparatus and method for mixing a small quantity of fluid within a hybridization chamber.

BACKGROUND

Conventional methods for mixing relatively large volumes of fluids utilize mixing devices that mix the fluids by shaking the container, by a rapid mechanical up and down motion, or by a rocking motion that tilts the container back and forth. Conventional mixing methods, however, cannot normally be applied to chemical and biological assays involving small samples in a fluid because the capillary strength of the containment system often exceeds the forces generated by shaking or rocking, thereby preventing or minimizing motion of the fluid. As an illustration, a small amount of fluid sample, when spread across a large reactive surface, will form a thin film of fluid that may have a thickness of a few microns to a few millimeters. In such situations, the fluid may not adequately contact the entire reactive surface or the reactive compounds in the fluid may be very dilute, thereby resulting in a reaction that is limited by the rate of diffusion through the fluid. Inadequate mixing can adversely affect the reproducibility of results, the sensitivity or specificity of the reaction, the rate of reaction, the extent of reaction, the homogeneity, or the percent yield.

Inadequate mixing is a particular problem in chemical and biological assays performed on microarrays that typically involve very small samples of chemical, biochemical, or biological fluids. In microarrays, the targets or probes are usually immobilized on a solid support having a surface area that can be smaller than a few square centimeters. The solid support is typically a glass or fused silica slide which has been treated to facilitate attachment of either the targets or probes. A liquid containing the reactants is then brought into contact with the immobilized nucleotides on the solid support. In a typical procedure, the fluid is placed on the support, and the fluid and solid support are covered with another slide and placed in an environmentally controlled chamber such as an incubator for several hours. Typically, the reactants in the liquid diffuse to the interface where they react with the immobilized probes or targets, and a reaction, such as hybridization reaction, occurs. Detection of hybridization between an immobilized nucleotide sequence and a complementary probe offers a convenient and reliable means for isolating, sequencing, and analyzing nucleotides. However, when diffusion is the only means of bringing the reactants in the liquid in contact with the immobilized nucleotides, problems encountered include poor hybridization kinetics and poor reaction specificity and sensitivity.

The present invention describes an apparatus and method for mixing of a film of fluid by moving a bubble within the film. The use of bubbles for mixing large volumes of liquids is well known. For example, U.S. Pat. No. 5,443,985 to Lu et al. and U.S. Pat. No. 5,605,653 to DeVos describe the mixing and aeration of large volumes of liquid, such as a culture medium in a cell culture bioreactor by introducing extraneous gas at the bottom of the reactor thereby creating bubbles that travel upwards, thus mixing the liquid medium.

SUMMARY OF THE INVENTION

The invention, in one embodiment, is an apparatus for mixing a film of fluid, particularly a chemical, biochemical, or biological fluid, which typically comprises a reaction mixture, the apparatus comprising a first substrate having an inner surface and a substantially parallel second substrate having an inner surface, the inner surfaces defining a closed chamber therebetween. The closed chamber is adapted to retain a quantity of fluid so that the fluid is in contact with both inner surfaces. In addition, the apparatus comprises a means for introducing a bubble in the fluid, and a means for moving the bubble in the fluid. The inner surface of one or both of the substrates is functionalized with reactive moieties that can react with the components contained in the fluid.

The invention also provides a method for mixing a film of fluid comprising providing a first substrate and a substantially parallel second substrate, each substrate having an inner surface, the inner surfaces defining a closed chamber therebetween. The closed chamber is adapted to retain a quantity of fluid so that the fluid is in contact with both inner surfaces. The method further comprises introducing a fluid containing a plurality of components into the closed chamber so as to provide a film of fluid therein, introducing a bubble within the fluid film, and a means for moving the bubble in the film of fluid thereby mixing the film of fluid.

BRIEF DESCRIPTION OF THE DRAWINGS

FIG. 1 is a schematic diagram of an apparatus of the present invention.

DETAILED DESCRIPTION OF THE INVENTION

Definitions

Before describing the present invention in detail, it is to be understood that this invention is not limited to specific compositions, reagents, process steps, or equipment, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise.

The term "bubble" as used herein refers to a small ball of gas or a non-miscible liquid in a fluid.

The term "fluid" or "film of fluid" as used herein refers to a material that can flow such as a liquid or a semisolid.

The term "functionalization" as used herein relates to modification of a solid substrate to provide a plurality of functional groups on the substrate surface. The phrase "functionalized surface" as used herein refers to a substrate surface that has been modified so that a plurality of functional groups are present thereon.

The term "sample" as used herein relates to a material or mixture of materials, typically, although not necessarily, in fluid form, containing one or more components of interest.

The terms "nucleoside" and "nucleotide" are intended to include those moieties which contain not only the known purine and pyrimidine bases, but also other heterocyclic bases that have been modified. Such modifications include methylated purines or pyrimidines, acylated purines or pyrimidines, or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like. As used herein, the term "amino acid" is intended to include not only the L-, D- and nonchiral forms of naturally occurring amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine), but also modified amino acids, amino acid analogs, and other chemical compounds which can be incorporated in conventional oligopeptide synthesis, e.g., 4-nitrophenylalanine, isoglutamic acid, isoglutamine, $\epsilon$-nicotinoyl-lysine, isonipecotic acid, tetrahydroisoquinoleic acid, $\alpha$-aminoisobutyric acid, sarcosine, citrulline, cysteic acid, t-butylglycine, t-butylalanine, phenylglycine, cyclohexylalanine, $\beta$-alanine, 4-aminobutyric acid, and the like.

Figure 1A:
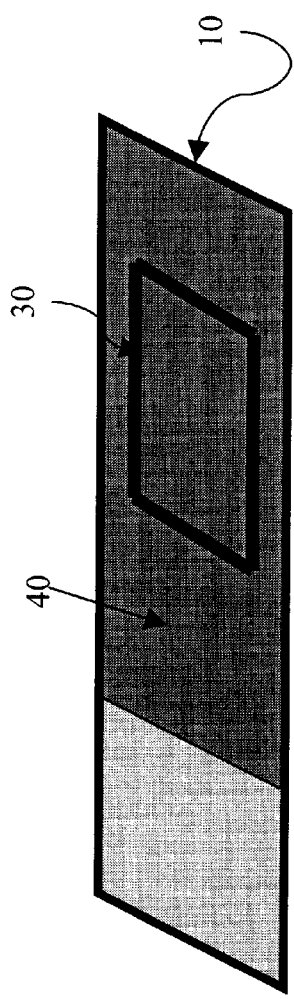
FIG. 1A illustrates the first substrate 10 with a seal 30 attached to the inner surface 40.
Figure 1B:
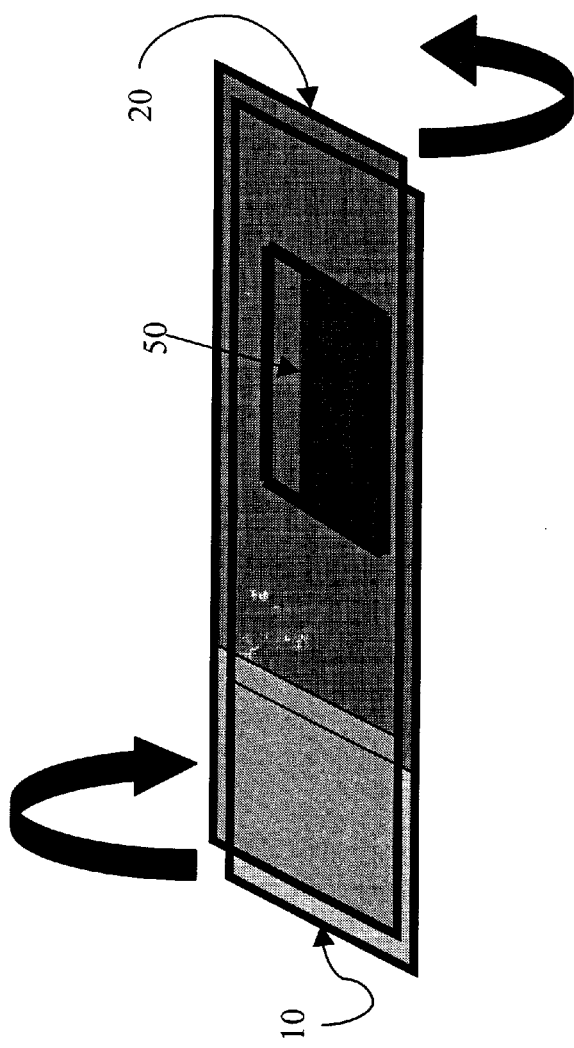
FIG. 1B shows a second substrate 20 held substantially parallel to the first substrate 10, and the closed chamber 50 containing a reactive fluid. The entire apparatus is rotated to move the bubble.

Accordingly, the invention in a first embodiment is directed to an apparatus, shown in FIG. 1, comprising a first substrate 10 having an inner surface 40 and a second substrate 20 forming a chamber 50 that can retain a film of fluid and a means of introducing a bubble in the film of fluid. The substrate may be composed of any material that is compatible with the fluids with which the surface comes in contact, such as, for example, glass, gel, silicon, fused silica, paper, metal, ceramic, plastic, or other polymers such as nylon. The substrate may be rigid or flexible, and may define a shape that is substantially planar in the shape of a circle, an ellipse, a square, a rectangle, a triangle, or any other convenient substantially planar shape. The surface area of the inner surface that comes in contact with the fluid is preferably on the order of about 100 $mm^2$ to about 20 $cm^2$, more preferably from about 500 $mm^2$ to about 10 $cm^2$, and most preferably about 1 $cm^2$ to about 4 $cm^2$. The volume of the fluid that can be retained by the inner surface is preferably less than about 300 $\mu$l, more preferably less than about 150 $\mu$l, and most preferably less than about 50 $\mu$l.

Optionally, a seal 30 can be attached upon the inner surface of the substrate, for instance close to the outer periphery of the substrate, thus creating a chamber for the fluid with a defined thickness. Such a seal may be of any suitable dimensions, defining a chamber of variable volume as may be advantageous for a particular application. The seal can be solid or flexible, and is fabricated from, for example, adhesives, rubber, gel, plastic, glass, or metal. The apparatus optionally includes an opening in one of the substrates or in the seal for introducing fluid into the closed chamber. The opening may be a port or other entrance. The fluid may be introduced by centrifugal means, pressure means, vacuum means, positive displacement means, or other means known in the art.

In one embodiment, the fluid is applied to the first substrate having a seal attached to the outer periphery. Preferably, the fluid is applied near the center of the apparatus, and then distributed across the first surface to give the film of fluid. Prior to the initiation of the mixing process, the fluid can be distributed across the inner surfaces of the substrate by, for example, rotating the apparatus, or by spreading with a cover slip. Then, a second substrate 20, having an inner surface, is placed on top of the seal where the substantially parallel substrates define a closed chamber 50. The substrate can be, for example, a glass cover slip, or can be composed of any other suitable material. The closed chamber may be from about 100 micron to several millimeters in thickness, preferably from about 250 microns to about 500 microns in thickness.

Once, the chamber 50 is substantially filled with liquid, a gas or a non-miscible liquid, such as mineral oil or an organic solvent, is introduced into the fluid creating a bubble. The gas may be air, hydrogen, helium, oxygen, nitrogen, or argon, preferably air or nitrogen. The non-miscible liquid may be mineral oil, or an organic solvent, such as pentane, hexane, chloroform, dichloromethane, ether, benzene, toluene, and the like. Subsequently, the bubble is moved through the film of liquid thereby mixing the fluid in the chamber.

In another embodiment, the apparatus is first assembled, and then fluid is introduced into the closed chamber 50. The chamber is substantially filled with the liquid, and then a bubble is created. Alternatively, a volume of fluid that is about 50% of the total volume of the chamber 50 is introduced, thereby creating a bubble. In yet another embodiment, a solid particle is introduced into the fluid. The solid particle can be a plastic particle, a ceramic particle, a metal particle, or a magnetic particle, and may be introduced as a single particle, a mixture of particles, or as a slurry.

The fluid can be mixed by tilting the entire apparatus so that the bubble or the solid particle moves back and forth. The bubble can be moved along a circular pattern, for example, by rolling the apparatus to induce a stirring motion in the film of fluid. Alternatively, the bubble can be moved back and forth by moving the apparatus back and forth thereby inducing a back and forth motion in the fluid. Alternatively, the bubble can be moved by rotating the apparatus about an axis by attaching the apparatus to an external motor. The rotation speed may, for example, be in the range of less than one rotation per minute to several hundred rotations per minute, preferably less than 1 rpm. The rotation speed may be in the range of about 0.01 rpm to about 400 rpm, preferably in the range of about 0.05 rpm to about 40 rpm, or alternatively in the range of about 0.1 rpm to about 1 rpm. When the fluid contains a small magnetic particle, the fluid can be mixed by moving the particle with a magnet.

The inner surface of the substrate is functionalized with reactive moieties according to the methods described in PCT application WO95/11995 (Chee et al.), Lockhart, D. J. et al. (1996; Nat. Biotech. 14:1675–1680) and Schena, M. et al. (1996; Proc. Natl;. Acad. Sci. 93:10614–10619), all of which are incorporated by reference herein in their entirety.

The reactive moieties may be polynucleotides or hybridizing analogues or mimetics thereof, including: nucleic acids in which the phosphodiester linkage has been replaced with a substitute linkage, such as phosphorothioate, methylimino, methylphosphonate, phosphoramidate, guanidine and the like; nucleic acids in which the ribose subunit has been substituted, e.g. hexose phosphodiester; peptide nucleic acids, and the like. The polynucleotide moieties may be single or double stranded, and may be PCR fragments amplified from cDNA.

The polynucleotides may be preformed and then stabely associated with the inner surface. A number of different array configurations and methods for their production are known to those of skill in the art and disclosed in U.S. Pat. Nos. 5,445,934; 5,532,128; 5,384,261; and 5,700,637, the disclosures of which are herein incorporated in their entirety by reference.

Alternatively, the polynucleotide reactive moieties comprising the specific oligonucleotide with homology to a common vector sequence may be synthesized on the surface of the substrate by using a chemical coupling procedure and an ink jet application apparatus, as described in PCT application WO95/251116 (Baldeschweiler et al.) which is incorporated herein in its entirety by reference. In another aspect, a "grid" array analogous to a dot blot may be used to arrange and link cDNA fragments or other elements to the surface of a substrate using a vacuum system, thermal, UV, or other mechanical or chemical bonding procedures known in the art. An array may be produced by hand or by using available devices (e.g., slot or dot blot apparatuses), materials (any suitable solid support), and machines (including robotic instruments) and may contain, for example, 8, 24, 96, 384, 1536 or 6144 elements, or any other multiple between two and one million which lends itself to the efficient use of commercially available instrumentation.

Alternatively, two or more different fluids, each containing a reactive moiety, can be introduced into the closed chamber and mixed to substantial homogeneity. This is advantageous, for example, when it is inconvenient or not possible to attach the ligands to the reactive moiety on the inner surface of the solid substrate.

In addition, the apparatus may be placed under controlled environmental conditions wherein the temperature, pressure, humidity, light intensity and the like are maintained and monitored. The apparatus can also be adapted for use with multiple fluid chambers simultaneously, where the temperature controlled environment is capable of containing and mixing multiple fluid chambers.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperatures, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Hybridization to DNA Arrays

An array of DNA probes was constructed by attaching a plurality of known probes comprising oligomers, PCR product, or cDNA at specific locations on the inner surface of the substrate using techniques well known in the art.

The substrate was a glass slide having a reactive surface area of about 4 cm$^2$. A rubber seal, having two notches located on the same face and a thickness of 25 $\mu$, was placed around the outer edge of the substrate. A second glass slide was placed parallel to the first substrate and on top of the seal and secured in place. Through one of the notches, about 50 $\mu$l of reactive fluid, comprising a sample of mRNA, was introduced into the chamber. The volume of reactive fluid equated to about 50% of the total volume of the chamber. The notches in the seal were then filled with epoxy to create the closed chamber.

The apparatus was placed in a 50 mL falcon tube, and rotated with rotissery rollers in a hybridization oven heated to approximately 65° C. The rotation speed was less than 1 rpm. After 2 hours, the sample was removed from the apparatus, the inner surface of the substrate was washed with a solution of KSSC/0.1% SDS at 37° C. for 10 minutes, and the apparatus was then analyzed by fluorescence detection to determine the quantity of mRNA that had hybridized to each location. The entire process can be automated by use of computer control.

It is to be understood that while the invention has been described in conjunction with preferred specific embodiments thereof, the foregoing description, as well as the examples which follow, are intended to illustrate and not limit the scope of the invention. Other aspects, advantages and modifications within the scope of the invention will be apparent to those skilled in the art to which the invention pertains.

What is claimed is:

1. An apparatus for mixing a fluid, the apparatus comprising:
   a first substrate comprising a first inner surface functionalized with a microarray of reactive moieties;
   a substantially parallel second substrate also comprising a second inner surface, wherein said first and second inner surfaces bound a closed chamber there between, said chamber adapted to retain a quantity of fluid so that the fluid is in contact with both surfaces;
   at least one bubble disposed within said chamber; and
   means for moving the chamber so that the bubble moves relative to the fluid to effect mixing of the fluid.

2. An apparatus for mixing a fluid, the apparatus comprising:
   a first substrate comprising a first inner surface functionalized with a microarray of reactive moieties;
   a substantially parallel second substrate also comprising a second inner surface, wherein said first and second inner surfaces bound a closed chamber there between, said chamber adapted to retain a quantity of fluid so that the fluid is in contact with both surfaces;
   at least one bubble disposed within said chamber, wherein said bubble is a magnetic particle; and
   means for moving the bubble relative to the fluid to effect mixing of the fluid.

3. The apparatus of claim 1, wherein the closed chamber has a thickness of less than about 2 millimeters.

4. The apparatus of claim 2, wherein the closed chamber has a thickness of less than about 2 millimeters.

5. The apparatus of claim 1, wherein the closed chamber has a thickness of less than about 250 microns.

6. The apparatus of claim 2, wherein the closed chamber has a thickness of less than about 250 microns.

7. The apparatus of claim 1, wherein both inner surfaces are functionalized with reactive moieties.

8. The apparatus of claim 2, wherein both inner surfaces are functionalized with reactive moieties.

9. The apparatus of claim 1, wherein the bubble comprises a gas.

10. The apparatus of claim 1, wherein the bubble comprises a gas selected from the group consisting of air, nitrogen, argon, or oxygen.

11. The apparatus of claim 1, wherein the bubble comprises a non-miscible liquid.

12. The apparatus of claim 1, wherein the bubble is a solid particle.

13. The apparatus of claim 1, wherein the bubble is produced by introducing a volume of the fluid that is less than the total volume of the closed chamber.

14. The apparatus of claim 1, further including a flexible seal between the inner surface of the first substrate and the inner surface of the second substrate.

15. The apparatus of claim 2, further including a flexible seal between the inner surface of the first substrate and the inner surface of the second substrate.

16. The apparatus of claim 1, further comprising means for introducing fluid into the closed chamber.

17. The apparatus of claim 2, further comprising means for introducing fluid into the closed chamber.

18. The apparatus of claim 1, wherein the first substrate and the second substrate are individually comprised of a material selected from the group consisting of glass, silicon, fused silica, plastic, ceramic, and metal, and a combination thereof.

19. The apparatus of claim 2, wherein the first substrate and the second substrate are individually comprised of a material selected from the group consisting of glass, silicon, fused silica, plastic, ceramic, and metal, and a combination thereof.

20. The apparatus of claim 1, wherein the first substrate and the second substrate are individually comprised of glass.

21. The apparatus of claim 2, wherein the first substrate and the second substrate are individually comprised of glass.

22. The apparatus of claim 1, wherein the means for moving the bubble is selected from the group consisting of rotating the apparatus about an axis, rolling the apparatus, and reciprocally shaking the apparatus.

23. A method for mixing a fluid, comprising:
providing an apparatus according to claim 1;
introducing a fluid into the closed chamber;
introducing a bubble within the fluid; and
moving the bubble in the fluid to effect mixing of the fluid.

24. A method for mixing a fluid, comprising:
providing an apparatus according to claim 2;
introducing a fluid into the closed chamber;
introducing a bubble within the fluid; and
moving the bubble in the fluid to effect mixing of the fluid.

25. A method for mixing a fluid, comprising:
providing an apparatus according to claim 3;
introducing a fluid into the closed chamber,
introducing a bubble within the fluid; and
moving the bubble in the fluid to effect mixing of the fluid.

26. A method for mixing a fluid, comprising:
providing an apparatus according to claim 4;
introducing a fluid into the closed chamber;
introducing a bubble within the fluid; and
moving the bubble in the fluid to effect mixing of the fluid.

27. A method for mixing a fluid, comprising:
providing an apparatus according to claim 5;
introducing a fluid into the closed chamber;
introducing a bubble within the fluid; and
moving the bubble in the fluid to effect mixing of the fluid.

28. A method for mixing a fluid, comprising:
providing an apparatus according to claim 6;
introducing a fluid into the closed chamber;
introducing a bubble within the fluid; and
moving the bubble in the fluid to effect mixing of the fluid.

29. A method for mixing a fluid, comprising:
providing an apparatus according to claim 9;
introducing a fluid into the closed chamber;
introducing a bubble within the fluid; and
moving the bubble in the fluid to effect mixing of the fluid.

30. A method for mixing a fluid, comprising:
providing an apparatus according to claim 22;
introducing a fluid into the closed chamber;
introducing a bubble within the fluid; and
moving the bubble in the fluid to effect mixing of the fluid.

* * * * *

UNITED STATES PATENT AND TRADEMARK OFFICE
CERTIFICATE OF CORRECTION

PATENT NO. : 6,420,114 B1
DATED : July 16, 2002
INVENTOR(S) : Tod Bedilion et al.

It is certified that error appears in the above-identified patent and that said Letters Patent is hereby corrected as shown below:

<u>Title page,</u>
Item [75], Inventors, "Lozen Titsworth" should read -- Loren Titsworth --

Signed and Sealed this

Fourth Day of February, 2003

JAMES E. ROGAN
*Director of the United States Patent and Trademark Office*